United States Patent Office 3,443,992
Patented May 13, 1969

3,443,992
CLEANING EVAPORATOR TUBES
Richard Lee Schmidt, North Little Rock, and Richard Henry Featherston, Benton, Ark., assignors to Reynolds Metals Company, Richmond, Va., a corporation of Delaware
No Drawing. Filed Oct. 23, 1964, Ser. No. 406,177
Int. Cl. B08b 3/08
U.S. Cl. 134—41                8 Claims

ABSTRACT OF THE DISCLOSURE

A composition adapted for the removal of sodium aluminum silicate scale from processing equipment employed in the alkaline extraction of alumina from aluminous ores comprises an aqueous solution containing a mineral acid such as sulfuric acid, and an organic acid capable of forming a complex with aluminum, such as acetic acid, said solution having a pH not greater than about 4.

---

This invention relates to a novel method for the removal of sodium aluminum silicate scale from processing equipment employed in the alkaline extraction of alumina from aluminous ores. More particularly, the invention concerns such scale removal by means of an aqueous solution of a mineral acid and an organic acid capable of forming a complex with aluminum.

The Bayer process is the method most commonly employed for extracting alumina from aluminous ores such as bauxite. In accordance with the Bayer process, ground bauxite is digested with an aqueous solution of an alkali, such as, for example, caustic soda, or a mixture of caustic soda and sodium carbonate. During the digestion of bauxite with caustic soda solution, part of the silica present in the bauxite is dissolved along with the alumina. Depending upon the caustic soda concentration and the temperature and time of digestion, some of this dissolved silica precipitates as an insoluble complex sodium aluminum silicate and is removed along with other insoluble bauxite residues as a slurry, by subsequent settling and filtration.

The filtrate is an alkaline liquor containing the alumina dissolved in the form of a supersaturated sodium aluminate solution, from which the dissolved alumina is precipitated by seeding with alumina hydrate. The sodium aluminate solution also contains silica in a supersaturated state and precipitation of this silica as sodium aluminum silicate (desilication) takes place at various stages of processing. Thus, during precipitation of sodium aluminate solution to obtain alumina hydrate, a small amount of silica precipitates at the same time. After removal of the precipitated alumina hydrate, the spent liquor is customarily partially concentrated by evaporation to remove water equivalent to that introduced into the system with the ore and water used for washing residue and hydrated alumina. It is then heated in heat exchangers to the temperature required for further digestion of bauxite. Desilication continues to take place during the evaporation and heating operations, whereby sodium aluminum silicate scale is deposited on the evaporator unit and the heat exchange equipment surfaces. In a few weeks of operation the scale is built up to a thickness which adversely affects heat transfer efficiency of the equipment and necessitates shutting down the apparatus for descaling, with resultant loss of service and high manual labor costs.

Descaling is customarily performed by circulating inhibited sulfuric acid solution through the tube bundles of the evaporators and heat exchangers, followed by the use of mechanical tube reamers (turbining) to remove last traces of scale. This method is inefficient because the rate of attack of the acid is slow and repeated treatments are necessary before the tube surfaces become fairly clean. Moreover, the phenomenon of gelation occurs whereby, when the scale is thick, the acidity of the descaling solution depletes rapidly, producing precipitation of the dissolved salts in a gelatinous form, thereby blocking circulation of the solution through the tubes, and requiring mechanical cleaning.

One approach to this problem is the use of inhibited sulfuric acid containing a small proportion of bifluoride salts. This has the disadvantage that even though the acid concentration may be low, e.g. 8%, the presence of the ammonium bifluoride produces visible attack on the metal itself even at temperatures as low as 85° F. although the descaling operation is not appreciably accelerated.

In U.S. Patent 3,074,823 it is proposed to employ for descaling of sodium aluminum silicate deposits a solution of 10–12.5% by volume sulfuric acid, together with an inhibitor and a surface active agent. However, this involves the use of a high concentration of sulfuric acid, namely 18% to 23% by weight, and it is known that concentrations above about 12% tend to increase the corrosion rate.

In accordance with the present invention there is provided a novel method for the removal of sodium aluminum silicate scale employing an aqueous solution containing a mineral acid and an organic acid capable of forming a complex with aluminum. The method permits the use of a solution of said mineral acid in which the concentration of the mineral acid is less than about 12% by weight.

Any suitable mineral acid may be employed in the practice of the method of the invention, including, for example, sulfuric, hydrochloric, phosphoric, or nitric acid, but sulfuric acid is preferred. The concentration of mineral acid employed will depend upon the total acidity of the solution which is desired, but will in general range from about 4% to about 12%, by weight.

The organic acid employed in accordance with the invention is characterized by its ability to form complex ions with aluminum ions in solution. Such acids at the concentrations employed in the practice of the invention do not themselves attack the scale to any degree. However, when the organic acid is used in conjunction with the mineral acid, and in definite proportions in relation to the mineral acid, rapid dissolution of the scale takes place with no gelation at the acid-scale interface. The reason for this unexpected cooperative action of the mineral acid and the organic acid in increasing the dissolution rate of the scale is not fully understood. While it is not desired to be bound by any particular theory, it is believed that, in the absence of the organic acid, the mineral acid concentration is depleted at the acid-scale interface, causing the formation of a gelatinous precipitate which prevents further attack upon the scale. If the organic acid is present, the aluminum ion which is dissolved out of the scale by the mineral acid is complexed by the organic acid and is held in solution so that no precipitation of gelatinous aluminum compound occurs at the acid-scale interface. Then, in the absence of gel formation, the mineral acid is enabled to dissolve the scale rapidly and completely.

The organic acids which are employed in accordance with the invention include both aliphatic and aromatic monocarboxylic and polycarboxylic acids. Examples of suitable organic acids include acetic, formic, citric, tartaric, gluconic, and tannic acids, but acetic acid is preferred.

The proportion of the organic acid relative to the mineral acid will depend upon the characteristics of the particular combination of acids selected, but it is critical. If either too small or too large a ratio by weight of organic acid to mineral acid is employed, gel formation increases and the descaling rate is decreased. In general, the weight ratio of organic acid to mineral acid will be in the range of about 25% to about 60%, or, expressed in terms of total acidity present (content of organic acid plus mineral acid) the proportion by weight of the organic acid will range from about 20% to about 40%.

The preferred embodiment of the invention employs an aqueous solution containing about 12% by weight of sulfuric acid, and between about 3% and about 7% by weight of acetic acid. Thus, the weight ratio of acetic acid to sulfuric acid will be in the range of 3:12 to 7:12, or expressed as a percentage of the total acidity, the proportion of acetic acid ranges from 20% to 37%.

In order to minimize further the corrosive action of the mineral acid upon the metal surfaces, an inhibiting agent may be incorporated. Examples of suitable inhibiting agents are coal tar derivatives such as those commercially available under the designation Oakite PC8 for sulfuric acid and PC9 for acetic acid. These preparations do not, however, in any way affect the rate of dissolution of the scale by the mineral acid.

Employing mixtures of sulfuric acid and acetic acid, typical formulations will be as follows:

| Material | Parts by weight | |
|---|---|---|
| | (1) | (2) |
| Sulfuric acid | 12 | 12 |
| Acetic acid | 3 | 7 |
| Oakite PC8 inhibitor | 0.12 | 0.12 |
| Oakite PC9 inhibitor | 0.06 | 0.07 |
| Water | 85 | 81 |

The criticality of the ratio of organic acid to mineral acid in control of gel formation at the acid-scale interface is demonstrated by the data shown in the following table for mixtures of sulfuric acid and acetic acid:

TABLE 1

| Weight ratio acetic:sulfuric acids: | Freedom from gel formation at acid-scale interface |
|---|---|
| 0.00/12 | Poor. |
| 0.50/12 | Fair. |
| 1.00/12 | Good. |
| 3.00/12 | Excellent. |
| 5.00/12 | Do. |
| 7.00/12 | Do. |
| 9.00/12 | Slow descaling rate. |
| 12.00/12 | Poor descaling rate. |
| 15.00/12 | Do. |

It has been found further, in accordance with the invention, that by maintaining the ratio of organic acid to mineral acid within the critical range previously described, the acid mixture may be diluted with water to provide descaling solutions in which the total acidity is as low as 5% and yet the effectiveness of the solutions for rapid descaling is maintained. This permits further reduction of any tendency toward corrosive action on metal surfaces by the mineral acid. It has been found that as long as the pH of the descaling solution is maintained below about 4, the acid mixture will rapidly dissolve the scale, yet will not cause gel formation. Preferably the pH of the treating solution is kept below about 3. The starting pH of the acid mixture may vary between about 0.2 and 0.5 depending upon the total acid content. As descaling proceeds, the rate of descaling diminishes and gel formation at the acid-scale interface is noted. By control of the pH the effectiveness of the cleaning process can be kept at a maximum.

Another advantage of the method of the invention is that the acid mixture can be used at elevated temperatures without gelation or increase in the corrosion rate. Thus, an inhibited 12% by weight sulfuric acid solution cannot be employed at a temperature above about 120° F. without incurring a serious gelation problem. However, the mineral-organic acid mixtures of the invention may be employed for descaling at a temperature as high as 200° F. without gelation or increased corrosion. The preferred temperature for descaling is about 165° F. The effectiveness of the acid mixtures of the invention in minimizing corrosion even at elevated temperatures is shown by the data in the following table, for a mixture containing 12% sulfuric acid and 7% acetic acid by weight, and the amounts of each of the inhibitors mentioned previously in col. 3. Corrosion tests at elevated temperatures (175°–200° F.) showed no loss of weight, no etching, and no dimensional change of coupon samples for up to 96 hours, after which time the inhibitor failed:

TABLE 2

[Corrosive effect of $H_2SO_4$—$CH_3COOH$ solution on mild steel and lead]

| Total elapsed time at 175°–200° F. (hrs.) | Steel coupon | | Lead coupon | |
|---|---|---|---|---|
| | Thickness (inches) | Weight (grams) | Thickness (inches) | Weight (grams) |
| Start: | | | | |
| 0 | .13025 | 9.9714 | .2458 | 11.3902 |
| 4.5 | .13025 | 9.9714 | .2458 | 11.3902 |
| 48 | .13025 | 9.9714 | .2458 | 11.3902 |
| 80 | .13025 | 9.9714 | .2458 | 11.3902 |
| 96 | .13025 | 9.9714 | .2458 | 11.3902 |
| 112 | ¹.13025 | 9.9470 | .2458 | 11.3905 |

¹ Etched.

In comparison with the conventional procedure of descaling with inhibited 12% sulfuric acid, in which each treatment required about six hours, a treatment using the acid mixture of the invention requires only one hour. This results in a marked saving in acid and in time of shut-down, as well as in greatly simplified procedure.

Experience with the new method has demonstrated that following its introduction, tube replacements were reduced almost 50 percent, the reduction being attributable to the low corrosion rate with the dilute acid employed in the method of the invention and to the complete elimination of reamer type cleaning.

The following examples, which are to be considered as illustrative and not as limiting, serve to illustrate the practice of the invention:

Example 1

A 6-effect evaporator from the Bayer processing circuit in an alumina plant was isolated for descaling. The scale on the tubes on incomplete analysis showed the following chemical composition.

| | Percent |
|---|---|
| L.O.I. (loss on ignition) | 7.50 |
| $Fe_2O_3$ | 0.39 |
| $TiO_2$ | 0.10 |
| $Al_2O_3$ | 30.42 |
| $Na_2O$ | 22.00 |
| $SiO_2$ | 32.54 |
| CaO | 0.61 |

X-ray analysis identified noselite as the predominant crystalline component.

From the above chemical analysis the sodium aluminum silicate appeared to have a molecular composition of $Al_2O_3$: 1.19 $Na_2O$: 1.81 $SiO_2$.

An acid mixture of the following composition was prepared:

| | Parts by weight |
|---|---|
| $CH_3COOH$ | 3.00 |
| $H_2SO_4$ | 12.00 |
| Oakite PC8 | 0.10 |
| Oakite PC9 | 0.06 |
| Water | 85.00 |

This mixture was diluted with water to give a total acidity ($CH_3COOH+H_2SO_4$) of 10% by weight. The solution had a pH of about 0.4. 4,000 gallons of this solution were heated to 165° F. and circulated through the last three effects of the evaporator for about one hour.

At this point the pH of the circulating acid was about 2.8 and the tubes were clean. No turbining was required.

In the first three effects of the evaporator wherein the scaling is thicker, the first treatment consisted of 4,000 gallons of a 5% (total acidity) acid mixture. This was followed by a water wash and then two treatments of a 10% (total acidity) acid mixture to clean the tubes. The pH of the first batch of spent acid was about 2.8, the second batch of spent acid was about 2.8 and the third batch of spent acid was about 1.8. It should be noted that the last batch of spent acid still contained enough of the effective acid mixture to be used for further descaling. The tubes were so clean that no mechanical turbining was required.

Compared to the above procedure, the old procedure of using an inhibited 12% $H_2SO_4$ required as many as three treatments for the last three effects and six treatments for the first three effects along with mechanical turbining to remove the last traces of the hard scale.

Example 2

A three stage preheater unit from the Bayer circuit was isolated for descaling. The scale from the preheater had essentially the same chemical composition as in Example 1. A solution of sulfuric-acetic acid was prepared according to Example 1. An 1,800 gallon batch of a 5% (total acidity) acid mixture was circulated through the preheaters at a temperature of 165° F. and in one hour the spent acid showed a pH of 3. A fresh batch of 10% acid mixture was then circulated for one hour and upon examination the tubes were found to be free of scale; no turbining was required. The spent acid had a pH of about 2, indicating that the acid could be used for another descaling operation.

Compared to this method, the old procedure using a 12% inhibited $H_2SO_4$ took three treatments and a total circulation of eighteen to twenty hours. This was followed by mechanical turbining to clean the hard scale still attached to the metal surface.

Example 3

This example is given to show that other acid mixtures as disclosed by this invention could be used for the descaling operation. Conditions were:

15% total acidity (mineral acid+organic acid). Ratio of organic acid to mineral acid 7:12. Absence of gel formation and rapid descaling.

| Organic acid | $H_3PO_4$ | $H_2SO_4$ |
|---|---|---|
| Citric | Excellent | Excellent. |
| Acetic | do | Do. |
| Gluconic | do | Do. |
| Tartaric | do | Do. |
| Formic | do | Do. |
| Tannic | do | Do. |

Even though these examples illustrate use of these acid mixtures in descaling sodium aluminum silicate scale in Bayer equipment, it is obvious to those skilled in the art that similar scales containing aluminum as a component could be rapidly dissolved by the method of this invention.

What is claimed is:

1. Method for the removal of sodium aluminum silicate from processing equipment employed in the alkaline extraction of alumina from aluminous ores which comprises applying to the scale coated surfaces of the processing equipment an aqueous solution containing a mineral acid selected from the group consisting of sulfuric, hydrochloric, phosphoric and nitric acid in a concentration between about 4% and about 12% by weight and an organic acid selected from the group consisting of acetic, formic, citric, tartaric, gluconic and tannic acid, the weight ratio of said organic acid to the mineral acid being between about 25:100 and about 60:100, said solution having a pH not greater than about 4.

2. The method of claim 1 in which the mineral acid is sulfuric acid.

3. The method of claim 1 in which the mineral acid is phosphoric acid.

4. The method of claim 1 in which the solution includes an acid inhibitor.

5. The method of claim 1 in which the descaling temperature is between about 165° F. and about 200° F.

6. Method for the removal of sodium aluminum silicate scale from processing equipment employed in the alkaline extraction of alumina from aluminous ores which comprises applying to the scale coated surfaces of the processing equipment an aqueous solution containing sulfuric acid in a concentration between about 4% and about 12% by weight and acetic acid in a weight ratio to the sulfuric acid between about 3:12 and about 7:12, said solution having a pH not greater than about 3.

7. The method of claim 6 in which the concentration of the sulfuric acid is about 12% by weight.

8. The method of claim 6 in which the descaling temperature is between about 165° F. and about 200° F.

References Cited

UNITED STATES PATENTS

| 2,652,360 | 9/1953 | Bond et al. | |
| 2,710,792 | 6/1955 | McDonald et al. | 134—3 X |
| 2,832,703 | 4/1958 | Bell et al. | 134—22 |
| 2,913,360 | 11/1959 | Zaremski et al. | 252—142 X |
| 3,074,823 | 1/1963 | Dobbins | 134—41 X |

REUBEN FRIEDMAN, Primary Examiner.

C. M. DITLOW, Assistant Examiner.

U.S. Cl. X.R.

134—3, 22